Patented Jan. 11, 1949

2,459,109

UNITED STATES PATENT OFFICE 2,459,109

DIRECT SYNTHESIS OF ALKYL SUBSTITUTED STYRENE POLYMERS

Arthur Ferguson McKay, Montreal, Quebec, Canada, assignor to Dominion Tar & Chemical Company Limited, Montreal, Quebec, Canada, a corporation of Canada No Drawing. Application September 27, 1945, Serial No. 618,983

7 Claims. (Cl. 260—91)

This invention relates to the direct synthesis of alkyl substituted styrene polymers and more particularly to the catalytic addition of acetylene to an alkylated benzene having at least one replaceable nuclear hydrogen.

Previous attempts to react acetylene with aromatic hydrocarbons or phenol ethers in the presence of aluminum chloride or mercury salts to produce usable products have failed. Böeseken and Adler (Rec. tran. chim 48,474 (1929)) in repeating Varet and Vienne's (Bull. soc. Chim (2), 47, 917 (1887)) work obtained from the reaction of acetylene with benzene, an insoluble, infusible, yellow solid which was not a polymer of styrene. More recently Nieuwland, Vogt and Foohey (J. A. C. S. 52, 1018 (1930)) attempted to use a boron trifluoride-alcohol complex as a catalyst to effect the addition of acetylene to aryl hydrocarbons and phenolic ethers. In this connection they state, "In the reaction of acetylene with aryl hydrocarbons and phenolic ethers these acids (MeOH.BF₃:H₂SO₄ etc., in the presence of mercuric oxide or mercury salts) did not seem to be effective."

The object of the present invention is to provide an effective method for the direct catalytic addition of acetylene to alkylated benzene compounds of the character described for the production of alkyl substituted styrene polymers.

In accordance with the invention the addition of acetylene to the alkylated benzene is effected in the presence of catalysts consisting of an aliphatic ether which forms a stable complex with boron trifluoride and which is saturated with boron trifluoride and heated in the presence of a mercury salt such as mercuric oxide, mercurous oxide, mercuric fluoride, mercurous fluoride, mercuric sulfate or mercurous carbonate.

In the preferred method of preparing the catalytic ether complex, an aliphatic ether, stable to boron trifluoride, is saturated with boron trifluoride and heated in the presence of mercuric oxide to a temperature of 50 to 80° C. preferably about 60° C. The solution must be saturated with the boron trifluoride to be effective. The reason that saturation of the stable ether solution is necessary is not clearly understood, but it has been found essential to have free boron trifluoride in the ether-boron trifluoride complex $(R_2O.BF_3)$. Diethyl ether is preferred, but dimethyl, methyl-ethyl, dibutyl or other ethers stable to boron trifluoride may be used. Isopropyl ether, for example is not stable. Care must be taken to avoid local overheating which produces chemical changes in the complex, reduction of the mercuric oxide, formation of tar and deactivation of the catalyst. The catalytic complex may be formed by other methods. The stable ether-boron trifluoride complex saturated with boron trifluoride and the mercuric oxide may be mixed in the presence of the alkylated benzene compound, combined without heating, or mixed in the presence of any inert solvent not detrimental to the reaction. Small amounts (1–10% by weight of the ether boron trifluoride solution) of acids, e. g. trichloracetic, acetic, phosphoric, or water may be present without unduly interfering with the reaction. In some cases the presence of acid prolongs the life of the catalyst.

The hydrocarbon, consisting of one or more alkylated benzenes having at least one replaceable nuclear hydrogen, for example toluene, dimethylbenzenes, diethylbenzenes, trimethylbenzenes, and the like, is added to the catalyst in a suitable reactor. The latter may be glass-lined or constructed of iron or stainless steel. It must be provided with inlet and outlet tubes, charging and discharging vents, a gas-tight mechanical stirrer, a suitable means of recording the temperature of the reaction mixture, and a means of temperature control such as internal coils or a jacket.

The acetylene is introduced to the reactor at any desired pressure. Increased pressure is sometimes desirable to increase the velocity of the reaction. An inert gas such as nitrogen may be mixed with the acetylene. It is preferred to maintain the temperature of reaction between −5 and +5° C. although a temperature between −30 and +70° C. may be employed. After the desired quantity of acetylene has been absorbed, the reaction mixture is discharged into an alkaline solution to remove the catalyst. A 10% sodium hydroxide solution is effective. The catalyst may be removed by washing with water.

The unreacted hydrocarbon is then removed from the polymer in a stripping still at a reduced pressure, for example 30 mm. Steam distillation at atmospheric pressure can also be used to separate the unreacted hydrocarbon from the product.

The following examples are given for the purpose of illustrating the invention:

*Example No. 1*

The catalyst used in this and following examples was prepared by saturating diethyl ether with boron trifluoride and heating in the presence of mercuric oxide to 60° C. The hydrocarbon was then added to the catalyst.

1,000 parts of commercial xylene, 45 parts of diethyl ether saturated with boron trifluoride and 3 parts of mercuric oxide were placed in a glass-lined reactor. The reactor was equipped with inlet and outlet tubes, charging and discharging vents, a gas-tight mechanical stirrer, a thermometer well, and cooling coils. The temperature of the agitated mixture was maintained at 3±1° C. while acetylene was added at a gauge pressure of 2 pounds per square inch. 30 parts of acetylene were absorbed over a period of 1½ hours, after which the reaction mixture was washed with 10% sodium hydroxide solution to remove catalyst. The excess xylene was removed from the catalyst free solution in a stripping still. 125 parts of a soluble, fusible dimethyl styrene polymer were obtained, a theoretical yield of 82.3% based on absorbed acetylene.

*Example No. 2*

693.3 parts of mesitylene, 41.5 parts of ether saturated with boron trifluoride, and 1.5 parts of mercuric oxide were placed in a three-neck R. B. flask equipped with a gas-tight mechanical stirrer, inlet and outlet tubes, and a low-temperature thermometer. The temperature was held at −3±1° C. by use of a solvent-dry ice bath while 42 parts of acetylene were added at a gauge pressure of 2 lbs. per sq. in. At the end of the reaction, which required 35 minutes, the mixture was washed with excess 10% sodium hydroxide solution to remove catalyst. Then the excess mesitylene was removed in a stripping still to give 220.7 parts (93.7% by theory based on absorbed acetylene) of trimethylstyrene polymer.

*Example No 3*

1,000 parts of meta xylene, 45 parts of the ether saturated with boron trifluoride, and 2 parts of mercuric oxide were placed in a stainless steel reactor equipped with inlet and outlet tubes, charging and discharging vents, cooling coils and a gas-tight mechanical stirrer. The temperature was maintained at −20±1° C. for 1.5 hours while 30 parts of acetylene were absorbed at a gauge pressure of 2 lbs. per sq. in. The reaction mixture was then washed with excess 10% sodium hydroxide solution to remove the catalyst. After removing the unreacted meta xylene, there remained 1260 parts (83% by theory based on absorbed acetylene) of dimethylstyrene polymer.

This direct procedure provides an economical method of producing styrene polymers which are soluble and fusible, and useful for a variety of purposes, such as moulding, imparting water resistance to varnishes, and the like.

I claim:

1. A method for the direct synthesis of alkyl substituted styrene polymers which comprises reacting acetylene with an alkylated benzene having not more than three alkyl groups in the presence of a catalyst comprising a stable aliphatic ether-boron trifluoride complex saturated with boron trifluoride in the presence of a mercury salt.

2. A method as defined in claim 1 wherein the reaction is effected at a temperature of −30 to +70° C.

3. A method as defined in claim 1 wherein the reaction is effected at a temperature of substantially −5 to +5° C.

4. A method of producing alkyl substituted styrene polymers which comprises reacting an alkylated benzene having not more than three methyl groups and acetylene at a temperature between −30 and +70° C. in the presence of a mercury salt and a stable aliphatic ether-boron trifluoride complex saturated with boron trifluoride.

5. A method of direct synthesis of vinyl polymers which comprises reacting at minus 30 to plus 70° C. acetylene with methylated benzene having not more than three methyl groups in the presence of a catalyst comprising a stable aliphatic ether-boron trifluoride complex, saturated with boron trifluoride, and a mercury salt.

6. In the direct reaction of acetylene with trimethylbenzene, the improvement which comprises employing as catalyst a stable aliphatic ether-boron trifluoride complex, saturated with boron trifluoride, and containing a mercury salt.

7. In the reaction of methylated benzene having not more than three methyl groups with acetylene the improvement which comprises employing as catalyst a diethyl ether-boron trifluoride complex, saturated with boron trifluoride, and containing a mercury salt.

ARTHUR FERGUSON McKAY.

No references cited.